United States Patent [19]

Huerre et al.

[11] Patent Number: 4,982,062

[45] Date of Patent: Jan. 1, 1991

[54] ACTUATOR FOR A CHANGE-OVER SWITCH

[75] Inventors: Dominique Huerre, Angers; Guy Pissot, Bressoles, both of France

[73] Assignee: Societe Electronique De La Region Pays de Loire, Paris, France

[21] Appl. No.: 374,763

[22] Filed: Jul. 3, 1989

[30] Foreign Application Priority Data

Jul. 5, 1988 [FR] France ................................ 88 09067

[51] Int. Cl.$^5$ .............................................. H01H 3/12
[52] U.S. Cl. .................................. 200/345; 200/332.1
[58] Field of Search ............... 200/341, 344, 345, 330, 200/331, 332.1

[56] References Cited

U.S. PATENT DOCUMENTS

| 4,197,440 | 4/1980 | Debaigt ..................... 200/332.1 X |
| 4,260,866 | 4/1981 | Fujino et al. .................... 200/331 |
| 4,479,111 | 10/1984 | Madsen et al. ................. 200/340 X |

FOREIGN PATENT DOCUMENTS

| 266970 | 12/1968 | Austria ................................. 200/345 |
| 199344 | 10/1986 | European Pat. Off. . |
| 1438095 | 5/1966 | France . |
| 1571249 | 6/1969 | France . |
| 634686 | 2/1983 | Switzerland . |

*Primary Examiner*—Renee S. Luebke
*Attorney, Agent, or Firm*—Oblon, Spivak, McClelland, Maier & Neustadt

[57] ABSTRACT

The actuator for a change-over switch fixing device disclosed has a hollow guiding body in which there moves a transmission body actuated by a button and actuating the rod of a change-over switch. The contact surfaces between the movable body and the guiding body are far longer than they are wide.

4 Claims, 2 Drawing Sheets

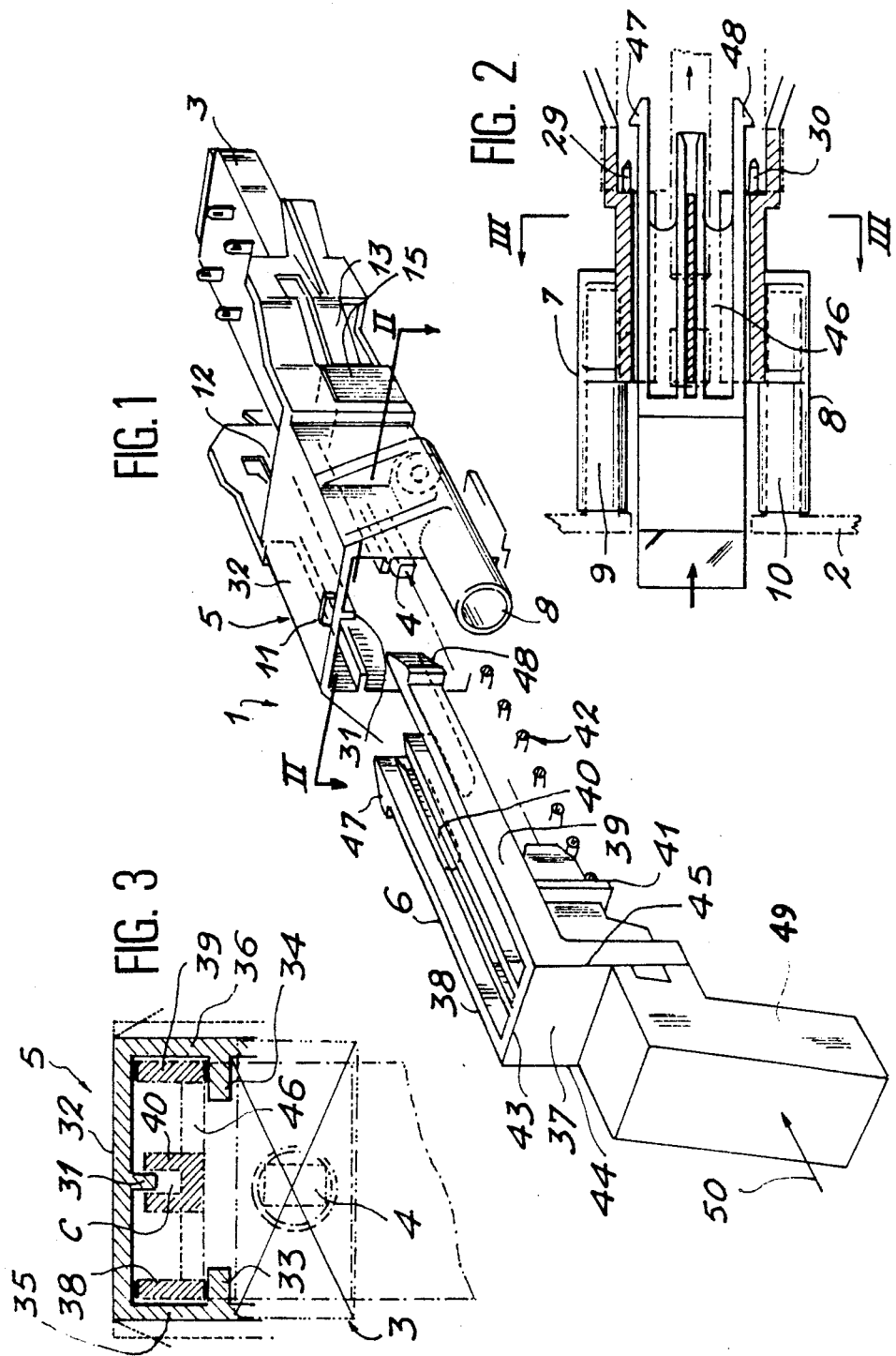

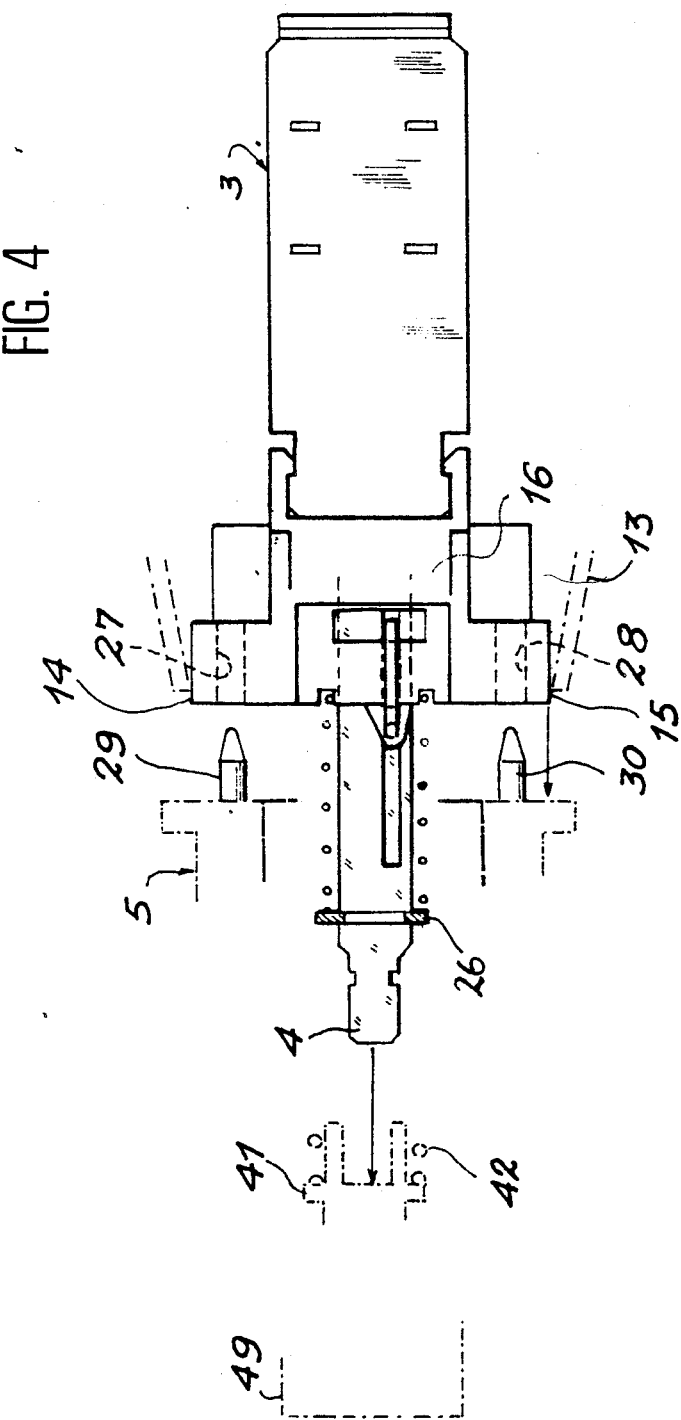

ACTUATOR FOR A CHANGE-OVER SWITCH

BACKGROUND OF THE INVENTION

1. Field of the Invention

The present invention is directed to an actuator for a change-over switch, such as an on/off switch.

2. Description of the Prior Art

To fix an on/off switch of the push-button type on the front of an instrument such as a television set, it is common to use means such as screws or nuts depending on the type of switch. A fixing member such as this cannot easily be automated. Furthermore, if a switch has to be fixed to a partition wall, having complicated shapes, and in a restricted space, as is the case for an on/off switch, of a television set, fixed to the rear face of the outer wall, there is the risk that this switch might end up being located in a place which is not easy to approach from this outer wall, between ribs serving to make the set rigid, and its actuating button may then be either too small or badly positioned. If the size of this button is increased or if it is fixed in a protruding position, the switch actuating mechanism is very likely to get stuck or jammed.

SUMMARY OF THE INVENTION

An object of the present invention is to provide a fixing device for switches enabling easy, advantageous fixing of switches, by means of an assembling robot for large batch production, even in positions that are difficult to get to, and to provide a device to which it is easy to adapt various shapes of actuating keys, even for actuation in a protruding position.

The fixing device according to the invention has a fixed, hollow guiding body in which a movable transmission element moves longitudinally, the change-over switch being fixed to the guiding body, an actuating button being fixed to the movable body, the movable body having two sets of longitudinal guiding surfaces which may be in contact with corresponding parts of the hollow body, the length of these guiding surfaces being far greater than their width, the surfaces of one set being perpendicular to those of the other set. The ratio between the length and the width of the guiding surfaces is preferably at least 10.

BRIEF DESCRIPTION OF THE DRAWINGS

The present invention will be better understood from the following detailed description of an embodiment, taken as a non-exhaustive example and illustrated by the appended figures, of which:

FIG. 1 is an exploded view, in perspective, of a fixing device according to the invention, with a switch;

FIG. 2 is a top sectional view along II—II of FIG. 1;

FIG. 3 is a sectional view along III—III of FIG. 2, and

FIG. 4 is a plan view of the switch of FIG. 1 with its support.

DESCRIPTION OF A PREFERRED EMBODIMENT

The invention is described below with reference to an on/off switch, but it is clearly not restricted to an application of this type, and it may be implemented to control any mechanical or electromechanical device having an axis of actuation with longitudinal translation motion.

The above-described fixing device 1 is designed for the fixing, on a wall 2, of a bipolar on/off switch 3 with an axial actuating rod 4 which, in the present case, has a cross-section that is substantially square shaped.

The device 1 essentially has a fixed hollow guiding body 5 in which a movable transmission body 6 moves longitudinally. The rectangular sectioned body 5 has, in a front part thereof, (which is closest to the wall 2 in the fixed position), two longitudinal guiding tubes 7, 8 working together with guiding pins 9, 10, formed on the wall 2. The body 5 also, has in a front part thereof, a boss or snap-on hook 11 working together with a corresponding stub (not shown) formed on the wall 2.

The body 5 has, at its rear part, two lateral snap-on tongues 12, 13, working together with lateral bosses 14, 15, formed on the fixing part 16 attached to the front part of the switch 3.

Longitudinal holes 27, 28, are made in the bosses 14, 5, of the part 16. These holes work together with dog points 29, 30 formed on the rear part of the body 5 to guide and hold the part 16 in position with the switch 3 when the bosses 14, 15 are snapped into the tongues 12, 13.

The body 5 has a first, longitudinal rib 31, with a rectangular section for example, formed in the middle of its wall 32, and extending practically over the entire length of the wall 32. The body 5 has two other internal longitudinal ribs, with a rectangular section, 33, 34, each being formed on one of its side walls 35, 36 respectively, said walls 35, 36 being parallel to the rib 31. The ribs 33, 34, are both located the same distance from the wall 32, somewhat at a third of the height of the walls 35, 36 from the wall 32.

The body 6 essentially has a wall 37, formed integrally with lateral guiding rods 38, 39 of equal length and a central guiding rod 40, slightly shorter than the rods 38, 39, as well as with a boss 41 used to fix a spring 42 at one end, the other end of this spring being supported on the ring 26 of the rod 4.

The wall 37 has a rectangular shape, with dimensions substantially equal to the internal dimensions of the cross-section of the body 5. One of the small sides of the rectangular rim of the wall 37 is referenced 43, and the two big sides, adjacent to the side 43, are referenced 44, 45.

The rods 38, 39 are perpendicular to the wall 37 and are formed from corners of the sides 43, 44 and 43, 45 respectively. The rods 38 and 39 have a rectangular section. The rod 40 has a U-shaped section, the opening of which is almost flush with the side 43, the two arms of this U being perpendicular to the side 43. The axis of this U goes through the middle of the side 43. The distance between the arms of the U is substantially equal to the thickness of the rib 31. The cross-section of the rod 40 has a rectangular axial contour. In this rectangular contour, the side opposite the U-shaped opening is coplanar with the small sides of the rods 38, 39.

The length of the big sides of the section of the rods 38, 39 is substantially equal to the distance between the ribs 33, 34 and the wall 32. The distance between the external big sides of the rods 38, 39, is slightly smaller than the distance between the walls 35, 36. The rods 38, 39 and rod 40 are connected, on their sides opposite the side 43, by a covering 46 which extends from the wall 37 over about two thirds of the length of the rods 38, 39.

The ends of the rods 38, 39 are shaped like hooks 47, 48 pointed outwards. These hooks 47, 48 are used to retain the body 6 in the element or body 5 when the rods 38, 39 are pushed in to their utmost extent in the rectangular space determined between the wall 32 and the ribs 33, 34 of the body 5. Since the ends of the rods 38, 39 are elastic, they slightly approach each other when their hooks 47, 48 are engaged in the body 5. When these hooks come out on the other side of the body 5, the rods 38, 39 return to their normal position, and the hooks retain the movable body 6 in the body 5.

The surfaces of the movable body 6 in contact with the body 5 are the following:

ends facing the arms of the rod 40, in contact with the side faces of the rib 31 on a portion of the height of this rib. Thus, guidance of the body 6 is obtained in a direction parallel to the axis of the rib 31;

lateral small sides of the rods 38, 39, in contact with the surfaces facing the wall 32 and the ribs 33, 34.

Since the length (measured along the longitudinal axis of the body 6) of these surfaces in contact is far greater (at least ten times greater) than their width, there is no risk at all of the body 6 being jammed by the body 5 even if the body 6 is actuated in a protruding position, namely if the wall 37 is not leaned on at the center C of the rectangle demarcated by the bases of the rods 38, 39 on the wall 37. It is possible to fix, for example by snap-on operation, an actuating button 49, the actuating surface (indicated by an arrow 50) of which is offset longitudinally from said center C.

According to one embodiment, the length of the contact surfaces of the bodies 5 and 6 is about 30 mm., and the width of each of them is about 2 mm.

Because the actuating button 49 can be fixed by being snapped on to the wall 37, it can very easily be custom-built without modifying the rest of the switch fsstening device which may be standardized.

Obviously, numerous modifications and variations of the present invention are possible in light of the above teachings. It is therefore to be understood that within the scope of the appended claims, the invention may be practiced otherwise than as specifically described herein.

What is claimed is:

1. An actuator for a change-over switching which comprises:
    a hollow guiding body within which a movable transmission element moves longitudinally,
    a switch fixed to the guiding body,
    an actuating button fixed to the movable element, the movable element having first and second sets of longitudinally guiding surfaces which contact with corresponding surfaces of the hollow guiding body, the length of said guiding surfaces being substantially greater than their width and the surfaces of the first set of the surfaces being perpendicular to those of the second set wherein the movable element comprises first and second guiding lateral rods and a central guiding rod positioned between said first and second lateral rods.

2. An actuator according to claim 1, wherein the ratio between the length and the width of the surfaces in contact is at least 10.

3. An actuator according to claim 1, wherein the change-over switch and the actuating button are snap-fitted to said guiding element and movable body, respectively.

4. An actuator according to claim 1, wherein the first and second guiding lateral rods have a rectangular section, small sides of which form the first of said sets of guiding surfaces, and the central guiding rod has a U-shaped section, and wherein ends of facing arms of the central guiding rod form the second of said sets of guiding surfaces.

* * * * *